United States Patent
Luger

(10) Patent No.: US 10,727,674 B2
(45) Date of Patent: Jul. 28, 2020

(54) SYSTEM FOR SUPPLYING AT LEAST ONE ELECTRICAL LOAD OR ENERGY STORAGE DEVICE WITH DIRECT CURRENT

(71) Applicant: INNOVA PATENT GMBH, Wolfurt (AT)

(72) Inventor: Peter Luger, Dornbirn (AT)

(73) Assignee: Innova Patent GmbH, Wolfurt (AT)

(*) Notice: Subject to any disclaimer, the term of this patent is extended or adjusted under 35 U.S.C. 154(b) by 329 days.

(21) Appl. No.: 15/556,216

(22) PCT Filed: Jan. 14, 2016

(86) PCT No.: PCT/AT2016/000002
§ 371 (c)(1),
(2) Date: Sep. 6, 2017

(87) PCT Pub. No.: WO2016/145463
PCT Pub. Date: Sep. 22, 2016

(65) Prior Publication Data
US 2018/0048156 A1    Feb. 15, 2018

(30) Foreign Application Priority Data
Mar. 19, 2015 (AT) .................... A 158/2015

(51) Int. Cl.
*B61B 7/04* (2006.01)
*H02J 3/38* (2006.01)
(Continued)

(52) U.S. Cl.
CPC ................ *H02J 3/38* (2013.01); *B61B 7/04* (2013.01); *H02J 7/02* (2013.01); *H02M 7/02* (2013.01); *H02M 7/23* (2013.01)

(58) Field of Classification Search
CPC ...... B61B 7/04; B61B 9/00; H02J 3/38; H02J 7/02; H02J 3/381; H02M 7/02; H02M 7/23
(Continued)

(56) References Cited

U.S. PATENT DOCUMENTS

| 5,768,117 A | 6/1998 | Takahashi et al. |
| 8,844,446 B2 | 9/2014 | Bavaresco et al. |

(Continued)

FOREIGN PATENT DOCUMENTS

| AT | 510677 A1 | 5/2012 |
| DE | 102011014536 A1 | 9/2012 |

(Continued)

*Primary Examiner* — Rexford N Barnie
*Assistant Examiner* — Toan T Vu
(74) *Attorney, Agent, or Firm* — Laurence A. Greenberg; Werner H. Stemer; Ralph E. Locher

(57) ABSTRACT

A system for supplying at least one electrical load or energy storage device with direct current by way of a plurality of electrical generators that are mounted to at rollers, in particular track rollers or support rollers, of a cable car system. The output of each of the generators leads to a respective AC/DC converter. All AC/DC converters are controlled or regulated by a control unit to the extent that at least approximately identical constant voltages are present at their outputs. The outputs of all AC/DC converters are connected to one another and are connected to the at least one load or energy storage device.

10 Claims, 4 Drawing Sheets

(51) Int. Cl.
*H02J 7/02* (2016.01)
*H02M 7/02* (2006.01)
*H02M 7/23* (2006.01)

(58) Field of Classification Search
USPC .................................. 307/9.1, 10.1; 472/32
See application file for complete search history.

(56) References Cited

U.S. PATENT DOCUMENTS

| | | | |
|---|---|---|---|
| 8,853,871 B2 | 10/2014 | Luger et al. | |
| 2008/0276826 A1* | 11/2008 | Erhart | B61B 12/002 |
| | | | 105/149.1 |
| 2011/0006600 A1* | 1/2011 | Fontana | H02J 1/001 |
| | | | 307/25 |
| 2011/0198847 A1 | 8/2011 | Hopewell | |
| 2011/0254284 A1 | 10/2011 | Catucci et al. | |
| 2011/0285130 A1 | 11/2011 | Thisted | |
| 2014/0103653 A1* | 4/2014 | Ubben | F03D 7/028 |
| | | | 290/44 |
| 2014/0306526 A1* | 10/2014 | Fontana | H02J 3/00 |
| | | | 307/24 |

FOREIGN PATENT DOCUMENTS

| | | |
|---|---|---|
| EP | 1992539 A1 | 11/2008 |
| EP | 2385602 A2 | 11/2011 |
| EP | 2623389 A1 | 8/2013 |
| JP | H06169598 A | 6/1994 |
| JP | 07194118 * | 7/1995 |
| JP | H07194118 A | 7/1995 |
| JP | 2004080980 A | 3/2004 |
| JP | 2005297635 A | 10/2005 |
| JP | 2008131736 A | 6/2008 |
| JP | 2009131086 * | 6/2009 |
| JP | 2009131086 A | 6/2009 |
| JP | 2009281196 A | 12/2009 |
| JP | 2012516666 A | 4/2012 |
| JP | 2014023286 A | 2/2014 |
| RU | 2008118121 A | 11/2009 |
| WO | 2008129019 A1 | 10/2008 |

* cited by examiner

SYSTEM FOR SUPPLYING AT LEAST ONE ELECTRICAL LOAD OR ENERGY STORAGE DEVICE WITH DIRECT CURRENT

BACKGROUND OF THE INVENTION

The present invention relates to a system for supplying at least one electrical load or energy storage device with direct current by means of a plurality of electric generators located at rollers—in particular, track rollers or support rollers—of a cableway system.

In cableway systems it is known to design a track roller of a cableway vehicle or a support roller for a haulage cable or for a traction cable with an electric generator. In this respect, reference is made to EP 1 992 539 B1, EP 2 623 389 A1 and WO 2008/12019 A1.

By this means, by virtue of the motion of a cableway vehicle along a supporting cable of the cableway system by means of this track roller the electrical energy required in the vehicle—by which a heating system, for example, is operated—can be generated. To the extent that support rollers or hold-down rollers located on supports of cableway systems are concerned, the electrical energy required for electrical or electronic appliances located on the supports can be generated by this means. As a result of this, there is no requirement to run electrical leads to the supports.

As a rule, the electrical energy generated by a generator of such a type is fed into a battery from which electrical or electronic appliances are supplied with the requisite current. For the feeding of the battery, the alternating current generated by the generator is converted into direct current by means of a rectifier. Subsequently the voltage of this direct current is brought by means of a voltage converter to a predetermined constant voltage with which the battery is fed.

The supply of the electrical or electronic appliances with current can also be undertaken directly from the voltage converter.

The track rollers of running-gear assemblies of cableway vehicles, or the support rollers and hold-down rollers located on supports, via which haulage cables or traction cables of cableway systems are routed, have varying diameters—for production-engineering reasons or by reason of abrasive-wear phenomena—and varying rotational speeds by reason of varying running characteristics, by virtue of which varying electrical values as regards frequency and voltage arise at the outputs of electric generators provided therein or coupled therewith for entrainment. To the extent that the electrical energy generated by these generators is output to an electrical load assigned to said generators or to a battery, there is therefore a requirement to provide a control circuit for this, by which it is ensured that the electrical load or the battery is supplied from the generators with current that has a predetermined voltage.

SUMMARY OF THE INVENTION

In accordance with the invention, this control circuit consists in the output of each of the generators being routed to a respective AC/DC converter, all the AC/DC converters being controlled or regulated by means of a control unit to the effect that at least approximately equal constant voltages arise at their outputs, and the outputs of all the AC/DC converters being coupled with one another and connected to at least one load or to an energy storage device.

Each of the AC/DC converters preferably contains a rectifier, the output of which is connected to a DC/DC voltage converter. Furthermore, an output of each of the AC/DC converters is preferably connected to the control unit via a common bidirectional control line. In addition, an output of the control unit may be connected to the AC/DC converters via a measuring line or output line.

The control unit has preferably been designed with an input/output line. Furthermore, a frequency-measuring element may be connected to the output of the generators. In addition, a current-measuring element and a voltage-measuring element may be connected to the output of the DC/DC voltage converters in each instance. Furthermore, a temperature sensor may be linked to the generators in each instance. The outputs of the voltage-and-frequency-measuring elements, of the current-measuring elements, of the voltage-measuring elements and of the temperature sensors are preferably connected to a control circuit, and an output of the control circuit is preferably connected to the voltage converter.

BRIEF DESCRIPTION OF THE SEVERAL VIEWS OF THE DRAWING

The subject matter of the invention is elucidated in more detail below on the basis of an exemplary embodiment represented in the drawing, in which.

DESCRIPTION OF THE INVENTION

Figure 1:
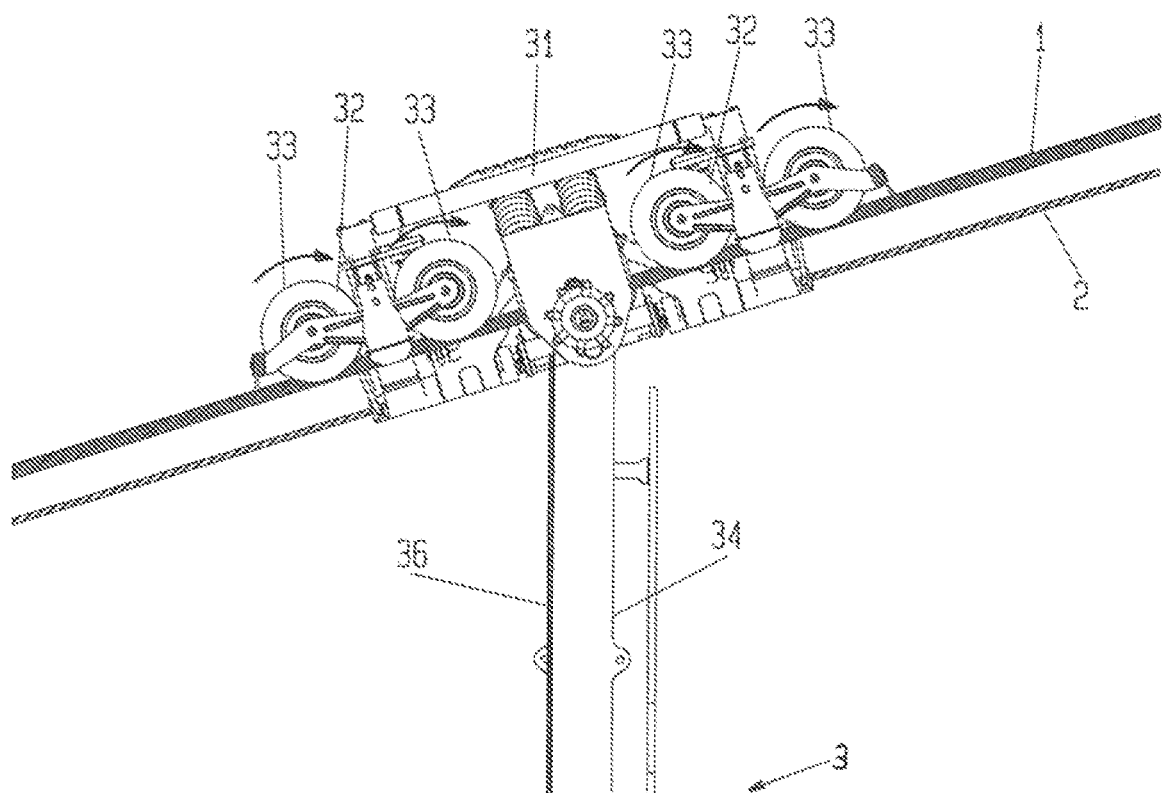
FIG. 1 shows a vehicle in a cableway system, in side view.
Figure 1:
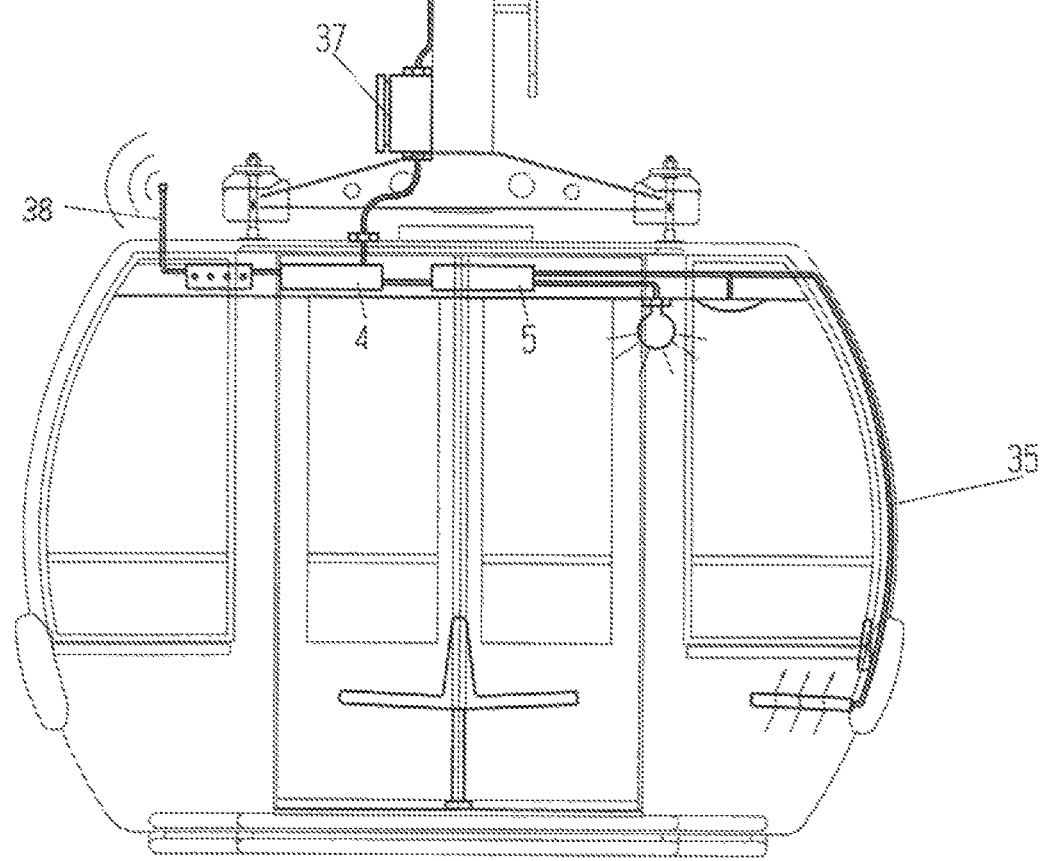

FIG. 1 shows a portion of a cableway system with a supporting cable 1 on which a vehicle 3 is traversed by means of a traction cable 2. The vehicle 3 has been designed with a running gear 31 on which two rocker arms 32 are located on which eight track rollers 33 are supported. The running gear 31 is moved by means of the traction cable 2, in the course of which the track rollers 33 roll along the supporting cable 1. Articulated to the running gear 31 is a supporting rod 34, at the lower end of which a cableway cabin 35 is located.

Some or all of the track rollers 33 have been designed with electric generators by which electric current is generated by the motion of the running gear 31 along the supporting cable 1. The voltage and the frequency of the electric current generated by the individual generators by this means depend on the design of the generators and on the rotational speeds of the track rollers 33. The outside diameters of the track rollers 33 may be of varying size by reason of manufacturing tolerances and by reason of varying abrasive-wear phenomena.

By reason of varying outside diameters, by virtue of which varying rotational speeds arise, and by reason of varying running characteristics of the track rollers 33, current having varying voltages and varying frequencies is consequently generated by the electric generators.

Lines 36 which are routed along the supporting rod 34 to a distributor box 37 are linked to the generators located in the track rollers 33. The outputs of the distributor box 37 are connected to an AC/DC converter circuit 4 located in the cableway cabin 35, in which the current generated by the individual generators is rectified and converted to a predetermined voltage. The output of the AC/DC converter circuit 4 is connected up to a distributor circuit 5 by which the supply of the electrical loads located in the cableway cabin 35—such as a lighting system, a sound system, display screens, heating appliances and appliances for telecommunication—or of a battery with electrical energy is controlled. The cableway cabin 35 has furthermore been designed with a transmitting/receiving antenna 38.

Figure 2:
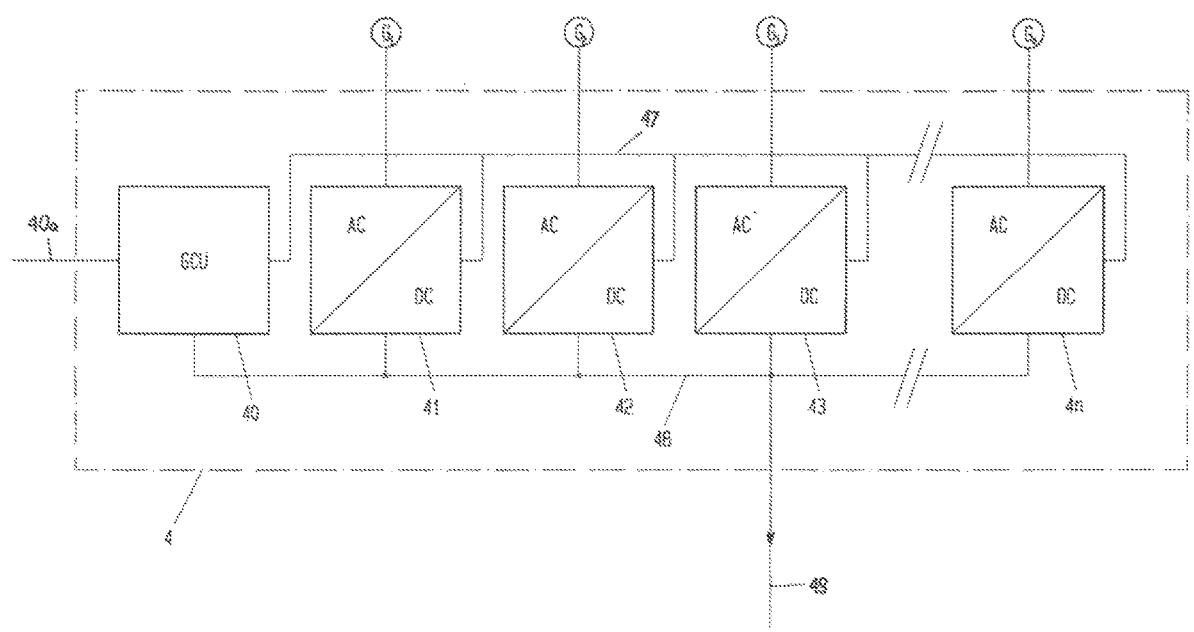
FIG. 2 shows a switching arrangement with AC/DC converters for feeding a load by means of a plurality of generators located at track rollers.

As elucidated below on the basis of FIG. 2, the AC/DC converter circuit 4 contains a plurality of AC/DC converters 41, 42, 43 . . . 4n to which the outputs of the generators G1, G2, G3 . . . Gn located on or in the track rollers 33 are routed. The AC/DC converters 41, 42, 43 . . . 4n have been designed with, in each instance, two outputs which are connected, via a common bidirectional control line 47 and via a common measuring line 48, to a control unit 40 by which the AC/DC converters 41, 42, 43 . . . 4n are controlled or regulated to the effect that the electric direct current that is output by the individual AC/DC converters 41, 42, 43 . . . 4n has the same predetermined voltage. The control device 40 has been designed with an input/output line 40a. The current that is output to an output line 49 by the AC/DC converter circuit 4 via the measuring line 48 is routed to the electrical loads or to a battery.

Figure 3:
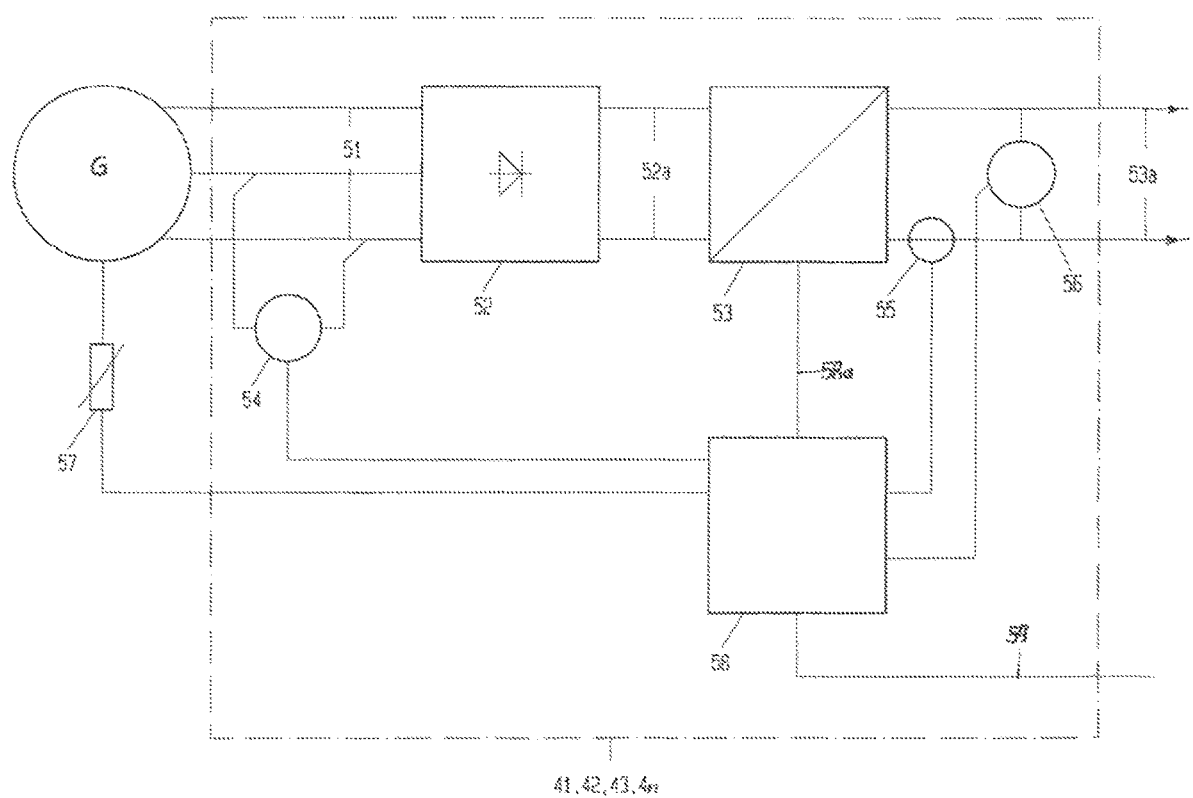
FIG. 3 shows a circuit arrangement for controlling the voltage of the electric current generated by the individual generators.

The design of the AC/DC converters 41, 42, 43 . . . 4n is elucidated below on the basis of FIG. 3:

The three phases of the current generated by one of the generators G are applied via a line 51 to a rectifier 52 by which the alternating current that is output by the generator G is converted into an undulatory direct current. The direct current that is output by the rectifier 52 is output via a line 52a to a DC/DC voltage converter 53 in which the voltage of this direct current is converted to a constant predetermined value. The direct current that is output by the DC/DC voltage converter 53 is supplied to the loads via output line 53a.

A voltage-and-frequency-measuring element 54 by which the voltage and the frequency of the current that is output by the generator G are ascertained is linked to the output line 51 of the generator G. A current-measuring element 55 and a voltage-measuring element 56 are linked to output line 53a. Furthermore, a temperature sensor 57 is assigned to the stator winding of the generator G.

In addition, a control circuit 58 is provided, to which the outputs of the voltage-and-frequency-measuring element 54, of the current-measuring element 55, of the voltage-measuring element 56 and of the temperature sensor 57 are connected. The DC/DC voltage converter 53, linked via a control line 58a, is monitored or controlled by this control circuit 58 to the effect that the current that is output via output line 53a has the predetermined constant voltage. Output lines 53a are linked to output line 49 which is evident from FIG. 2. The control circuit 58 has been designed with a further line 59 which links to the bidirectional control line 47 represented in FIG. 2.

Figure 4:
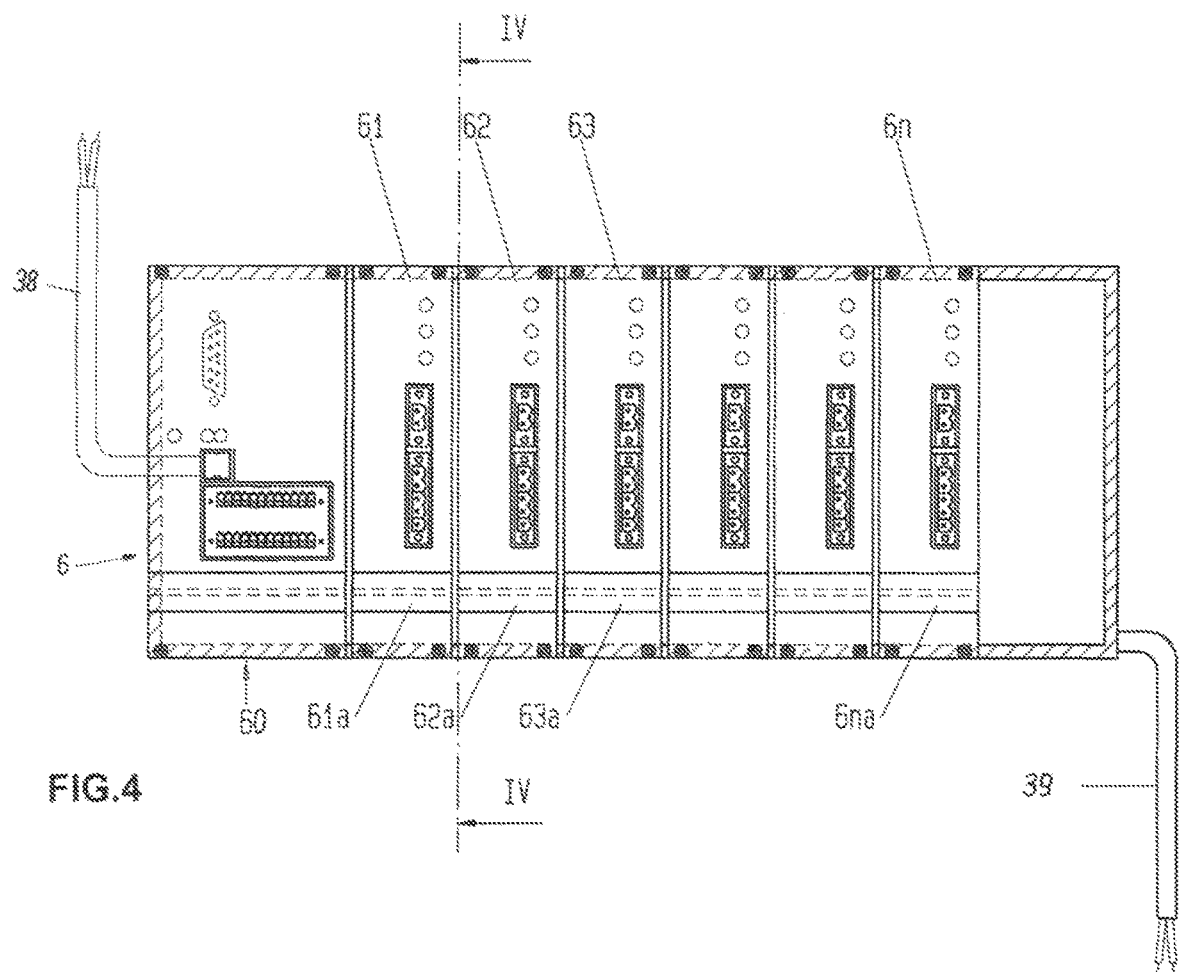
FIG. 4 shows a modular unit with several AC/DC converters, in top view.
Figure 4A:
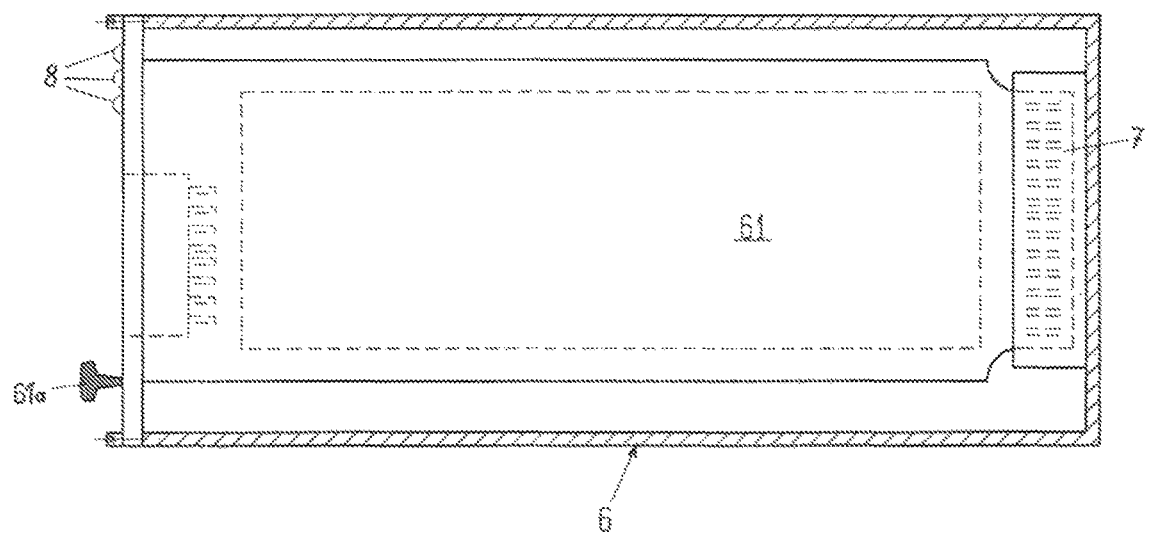
FIG. 4A shows the view according to the section along line IV-IV shown in FIG. 4.

As represented in FIG. 4 and FIG. 4A, the AC/DC converter circuit 4 takes the form of a modular unit 6 which has a frame 60 in which modules 61, 62, 63 . . . 6n are inserted, on which the AC/DC converters 41, 42, 43 . . . 4n are located. The modules 61, 62, 63 . . . 6n have been designed with gripping ridges 61a, 62a, 63a . . . 6n. The linking of the modular unit 6 to the distributor circuit 5 is effected by means of a multipolar line 39 via which the rectified current having the predetermined constant voltage is output to the loads or to at least one energy storage device.

The modular unit 6 has furthermore been designed with contact ridges 7 which are assigned to the modules 61, 62, 63 . . . 6n. In addition, the modular unit 6 is provided with LEDs 8. Furthermore, the modular unit 6 has been designed with the transmitting/receiving antenna 38.

The invention claimed is:

1. A system for supplying at least one electrical load or energy storage device in a cableway installation with direct current, the system comprising:
 a plurality of track rollers having outer diameters of varying size due to manufacturing tolerances or due to varying abrasive wear;
 a plurality of electric generators mounted at said track rollers of the cableway installation, each of said generators having an output carrying an AC voltage;
 a plurality of AC/DC converters having inputs respectively connected to said outputs of said generators and having DC outputs;
 a control unit connected to said AC/DC converters and configured to control or regulate said AC/DC converters so as to ensure substantially equal constant voltages at said DC outputs regardless of the varying size of the outer diameters of said track rollers; and
 wherein said DC outputs of said plurality of AC/DC converters are coupled with one another and connected to the at least one electrical load or to the energy storage device; and
 wherein an output of each of said AC/DC converters is connected to said control unit via a common bidirectional control line.

2. The system according to claim 1, wherein said generators are mounted to saki track rollers or support rollers of the cableway system and are driven thereby.

3. The system according to claim 1, wherein each of said AC/DC converters contains a rectifier having an output connection connected to a DC/DC voltage converter.

4. The system according to claim 1, wherein said control unit has an output connected to said AC/DC converters via a measuring line or an output line.

5. The system according to claim 1, wherein said control unit is configured with an input/output line.

6. The system according to claim 1, which comprises a frequency-measuring element connected to said output of each of said plurality of generators.

7. The system according to claim 3, which comprises a current-measuring element and a voltage-measuring element connected to the output of each of said plurality of DC/DC voltage converters.

8. The system according to claim 1, which comprises a respective temperature sensor linked to each of said plurality of generators.

9. The system according to claim 1, which comprises a control circuit and a plurality of elements selected from the group consisting of voltage and frequency measuring elements, frequency-measuring elements, current-measuring elements, voltage-measuring elements and temperature sensors respectively connected to said control circuit.

10. The system according to claim 9, wherein said control circuit has an output connected to a DC/DC voltage converter.

* * * * *